United States Patent
Takahashi

(10) Patent No.: US 6,483,943 B1
(45) Date of Patent: Nov. 19, 2002

(54) FEATURE VALUE EXTRACTION METHODS AND APPARATUS FOR IMAGE RECOGNITION AND STORAGE MEDIUM FOR STORING IMAGE ANALYSIS PROGRAM

(75) Inventor: Hiroyasu Takahashi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/409,152

(22) Filed: Sep. 30, 1999

(30) Foreign Application Priority Data

Oct. 2, 1998 (JP) .......................................... 10-281022

(51) Int. Cl.⁷ .......................... G06K 9/48; G06K 9/50; G06K 9/46; G06K 9/40
(52) U.S. Cl. ...................... 382/199; 382/203; 382/205; 382/266
(58) Field of Search .............................. 382/190, 195, 382/196, 197, 198, 199, 201, 202, 203, 205, 243, 266, 200, 241

(56) References Cited

U.S. PATENT DOCUMENTS

| | | | | |
|---|---|---|---|---|
| 4,513,444 A | * | 4/1985 | Okai et al. | 382/242 |
| 4,628,532 A | * | 12/1986 | Stone et al. | 382/197 |
| 5,091,976 A | * | 2/1992 | Murayama | 382/242 |
| 5,119,445 A | * | 6/1992 | Suzuki et al. | 382/205 |
| 5,590,220 A | * | 12/1996 | Takahashi | 382/203 |

FOREIGN PATENT DOCUMENTS

| | | | |
|---|---|---|---|
| EP | 0 632 403 A2 * | 1/1995 | ............ G06K/9/48 |
| JP | 6-195513 | 7/1994 | |

* cited by examiner

Primary Examiner—Joseph Mancuso
Assistant Examiner—Mehrdad Dastouri
(74) Attorney, Agent, or Firm—Paul J. Otterstedt; Ryan, Mason & Lewis, LLP

(57) ABSTRACT

One or more contours of a picture element (PEL) array pattern are detected and, then, a strength of concavity/convexity on each contour (acuteness) and a direction of concavity/convexity are determined. Using an acuteness value of a contour point of interest, its curvature is classified into a group of strong curvatures or another group of weak curvatures such that the definitions of a direction of the concavity/convexity (contour direction) is appropriately switched from one to another for calculation. In a preferred aspect of this invention, using an acuteness value of a contour point of interest, its contour curvature is classified into either one of five curvature groups, comprising "strong concavity," "weak concavity," "straight line/inflection point," "weak convexity," and "strong convexity." If its contour curvature is classified into either "strong concavity" or "strong convexity," then calculation of a normal line direction will be made for deriving a contour direction. On the other hand, if its contour curvature is classified into "straight line/inflection point," then calculation of a tangent line direction will be made. In so doing, it is possible to improve image recognition rates compared to those of the prior schemes utilizing conventional feature values.

3 Claims, 18 Drawing Sheets

FIG. 6
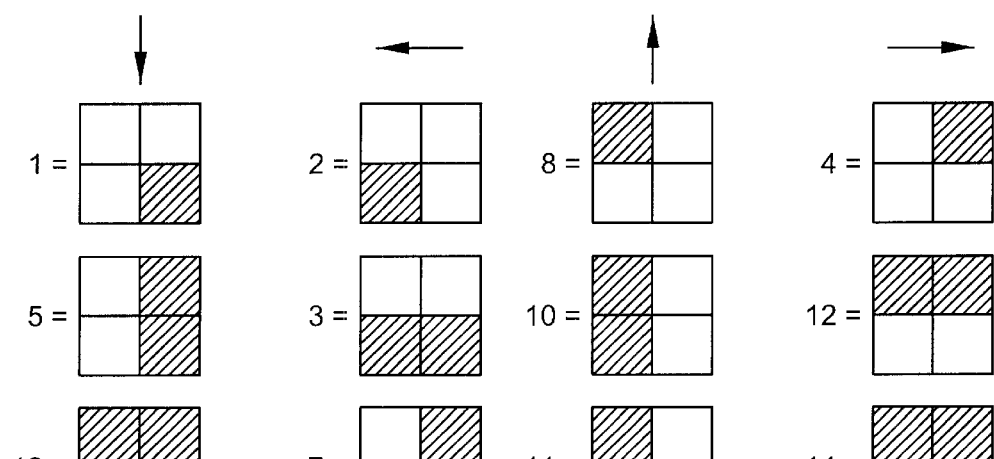
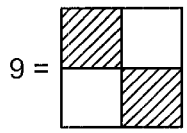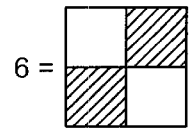
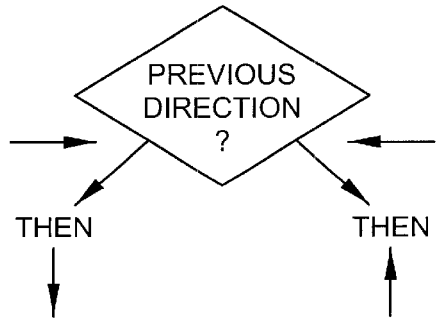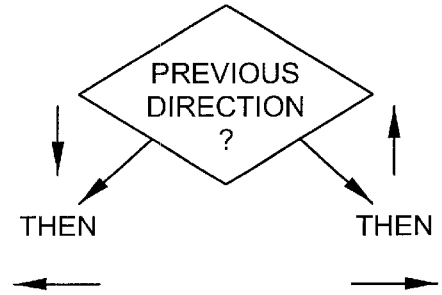

FIG. 9  ORIENTATION TABLE (STORED IN MEMORY)

FIG. 12

9-4: STRONG CONVEXITY
3-2: WEAK CONVEXITY
1-a: STRAIGHT LINE / INFLECTION POINT
b-d: WEAK CONCAVITY
e-i: STRONG CONCAVITY

FIG. 19

| | (y, x) | CONVEX/CONCAVE | DIRECTION | ACUTENESS |
|---|---|---|---|---|
| a: | 1, 1 | CONVEX | 0 | 6 |
| b: | 24, 1 | CONVEX | 3 | 9 |
| c: | 16, 5 | CONCAVE | 1 | 3 |
| d: | 16, 12 | CONVEX | 6 | 8 |
| e: | 13, 7 | CONCAVE | 3 | 5 |
| f: | 5, 10 | CONCAVE | 0 | 6 |
| g: | 24, 17 | CONVEX | 5 | 9 |

FEATURE VALUE EXTRACTION METHODS AND APPARATUS FOR IMAGE RECOGNITION AND STORAGE MEDIUM FOR STORING IMAGE ANALYSIS PROGRAM

FIELD OF THE INVENTION

This invention relates to an image processing method and, more particularly, to a method for extracting features of a picture element (PEL) array pattern by means of software.

BACKGROUND OF THE INVENTION

In pattern recognition such as optical character recognition, various features of patterns to be recognized have been extracted for use in classification of the patterns such as characters based on these features. For example, T. Kawatani, "Handprinted Numerals Recognition by Learning Distance Function," The Transactions of the Institute of Electronics, Information and Communication Engineers, September 1993, Vol. J76-D-2, No. 9, pp. 1851–1859 (in Japanese) discloses a technique adapted for determining attributes of a point on a contour in a PEL array pattern, such as a designation of concavity/convexity of the point indicating whether it is concave or convex, a direction of the concavity/convexity and a strength of the concavity/convexity (acuteness), whereby they may be utilized for calculating feature values of the PEL array pattern.

In this prior technique, however, a tangent line direction of a point of interest on a contour is simply regarded as a direction of the concavity/convexity of its contour portion, without giving any attribute of direction to a portion that has strong acuteness. While this prior technique enables to obtain a stable value for a direction of the concavity/convexity at a portion where a contour shape is approximate to a straight line as shown in FIG. 16, this does not apply to a portion where a contour shape has a strong curvature as shown in FIG. 17. This is because, in the illustrated situation, a slight positional change of a center point will cause a direction of the concavity/convexity to be radically changed, which will in turn result in an excessive variation of feature values to be extracted from a PEL array pattern. Thus, what has been needed in this technical field is a novel scheme that is capable of extracting features in a more stable manner.

Japanese Patent Publication No. 6-19551 (corresponding to U.S. Pat. No. 5,590,220), assigned to the present assignee, discloses a technique adapted for determining attributes of bending points (identified by the letters "a" through "g" in FIG. 18) on a contour in a PEL array pattern, such as a designation of concavity/convexity of a bending point of interest indicating whether it is concave or convex, a direction of the concavity/convexity and a strength of the concavity/convexity (acuteness) as shown in FIG. 19, whereby they may be utilized for calculating feature values of the PEL array pattern.

According to this prior technique, a direction of the concavity/convexity is calculated solely at a portion where a contour shape has a strong curvature as shown in FIG. 18 and, thus, it avoids said problem of an excessive variation of feature values to be extracted from a PEL array pattern. Nevertheless, this prior technique requires further processing such as dividing contour groups at each of the selected bending points and, hence, it eventually requires a large amount of calculation time for extracting a sufficient quantity of feature values to be used in pattern recognition.

Further, this prior technique entails difficulty in taking a strong convexity or concavity in the graphic of "0" and/or "O" that is approximate to a circle, thereby causing an occurrence position of a feature value to be unstable.

SUMMARY OF THE INVENTION

It is, therefore, an object of this invention to provide an image recognition system that is capable of deriving stable feature values, without depending on a contour shape of a graphic.

It is another object of this invention to quickly extract a sufficient amount of feature values for use in effective pattern (character and/or graphic) recognition of high recognition rates.

In accordance with this invention, one or more contours of a PEL array pattern are detected and, then, a strength of concavity/convexity on each contour (acuteness) and a direction of the concavity/convexity are determined. Using an acuteness value of a contour point of interest, its curvature is classified into a group of strong curvatures or another group of weak curvatures such that the definition of a direction of the concavity/convexity (contour direction) is appropriately switched from one to another for calculation. In a preferred aspect of this invention, using an acuteness value of a contour point of interest, its contour curvature is classified into either one of five curvature groups, comprising "strong concavity," "weak concavity," "straight line/inflection point," "weak convexity," and "strong convexity." If its contour curvature is classified into either "strong concavity" or "strong convexity," then calculation of a normal line direction will be made for deriving a contour direction. On the other hand, if its contour curvature is classified into "straight line/inflection point," then calculation of a tangent line direction will be made. In so doing, it is possible to improve image recognition rates as compared to those of the prior schemes utilizing conventional feature values.

In accordance with one aspect of this invention, there is provided a method for analyzing one or more contours detected from a picture element (PEL) array pattern and extracting feature values of the PEL array pattern, comprising the steps of:

(a) tracing the contours of said PEL array pattern and generating a list of a plurality of contour points that exist on each traced contour;

(b) calculating, for one of said plurality of contour points, an acuteness value representing a contour curvature;

(c) if said acuteness value indicates an acute curve, then using a first calculation equation to calculate a contour direction of said one contour point, and if said acuteness value indicates a straight line or an inflection point, then using a second calculation equation other than the first calculation equation to calculate a contour direction of said one contour point; and (d) outputting a feature value based on the contour direction of said one contour point.

Note that, in the claims of the present specification, the expression of "first calculation equation" represents a concept covering any equation adapted for calculating a direction that is approximate to a normal line or another direction calculated therefrom, such as a direction of a straight line connecting a contour point of interest and a midpoint between an Nth previous point and an Nth (or Mth) following point of the contour point of interest, as described below for a preferred embodiment. Similarly, the expression "second calculation equation" represents a concept covering any equation adapted for calculating a direction that is approximate to a tangent line or another direction calculated therefrom, such as a direction of a straight line connecting the Nth previous point and Nth (or Mth) following point of the contour point of interest, as described below for a preferred embodiment.

In accordance with another aspect of this invention, there is provided a feature extraction method, wherein said first calculation equation makes a calculation based on coordinate values of said one contour point $P_i$, coordinate values of an Nth previous point $P_{i-N}$ and coordinate values of an Nth following point $P_{i+N}$ of said one contour point, and wherein said second calculation equation makes a calculation based on the coordinate values of the Nth previous point $P_{i-N}$ and the coordinate values of the Nth following point $P_{i+N}$ of said one contour point.

In accordance with another aspect of this invention, there is provided a method for analyzing one or more contours detected from a picture element (PEL) array pattern and extracting feature values of the PEL array pattern, comprising the steps of:
(a) tracing the contours of said PEL array pattern and generating a list of a plurality of contour points that exist on each traced contour;
(b) calculating, for one contour point $P_i$ among said plurality of contour points, an acuteness value representing a contour curvature;
(c) based on the calculated acuteness value, determining either one of curvature groups, comprising "strong concavity," "weak concavity," "straight line/inflection point," "weak convexity" and "strong convexity," in which the contour curvature of said one contour point $P_i$ falls;
(d) if the contour curvature of said one contour point $P_i$ is determined to fall in either "strong concavity" or "strong convexity," then determining a contour direction based on a direction of a straight line connecting said one contour point $P_i$ and a midpoint between an Nth previous point $P_{i-N}$ and an Nth following point $P_{i+N}$ of said one contour point, and if the contour curvature of said one contour point $P_i$ is determined to fall in "straight line/inflection point," then determining a contour direction based on a direction of a straight line connecting said Nth previous point $P_{i-N}$ and Nth following point $P_{i+N}$; and
(e) outputting a feature value based on the contour direction of said one contour point.

In accordance with another aspect of this invention, there is provided an apparatus for analyzing one or more contours detected from a picture element (PEL) array pattern and extracting feature values of the PEL array pattern, comprising:
(a) image input means for capturing said PEL array pattern;
(b) an X-Y list, created by tracing the contours of said PEL array pattern, for controlling coordinate values of a contour point that exists on each traced contour;
(c) an acuteness list, created by calculating an acuteness value representing a contour curvature of said contour point;
(d) a contour direction list, created by using either a first calculation equation if said acuteness value indicates an acute curve, and by using a second calculation equation other than the first calculation equation if said acuteness value indicates a straight line or an inflection point; and
(e) means for outputting a feature value based on said contour direction list.

In accordance with another aspect of this invention, there is provided a computer readable storage medium for storing a program that is arranged to analyze one or more contours detected from a picture element (PEL) array pattern and to extract feature values of the PEL array pattern, said program comprising:
(a) program code means for causing said computer to trace the contours of said PEL array pattern and to generate a list of a plurality of contour points that exist on each traced contour;
(b) program code means for causing said computer to calculate, for one of said plurality of contour points, an acuteness value representing a contour curvature;
(c) program code means for causing said computer to use a first calculation equation to calculate a contour direction of said one contour point if said acuteness value indicates an acute curve, and to use a second calculation equation other than the first calculation equation to calculate a contour direction of said one contour point if said acuteness value indicates a straight line or an inflection point; and
(d) program code means for causing said computer to output a feature value based on the contour direction of said one contour point.

In accordance with another aspect of this invention, there is provided a storage medium, wherein said first calculation equation makes a calculation based on coordinate values of said one contour point $P_i$, coordinate values of an Nth previous point $P_{i-N}$ and coordinate values of an Nth following point $P_{i+N}$ of said one contour point, and wherein said second calculation equation makes a calculation based on the coordinate values of the Nth previous point $P_{i-N}$ and the coordinate values of the Nth following point $P_{i+N}$ of said one contour point.

In accordance with another aspect of this invention, there is provided a computer readable storage medium for storing a program that is arranged to analyze one or more contours detected from a picture element (PEL) array pattern and to extract feature values of the PEL array pattern, said program comprising:
(a) program code means for causing said computer to trace the contours of said PEL array pattern and to generate a list of a plurality of contour points that exist on each traced contour;
(b) program code means for causing said computer to calculate, for one contour point $P_i$ among said plurality of contour points, an acuteness value representing a contour curvature;
(c) program code means for causing said computer to determine, based on the calculated acuteness value, either one of curvature groups, comprising "strong concavity," "weak concavity," "straight line/inflection point," "weak convexity" and "strong convexity," in which the contour curvature of said one contour point $P_i$ falls;
(d) program code means for causing said computer to determine a contour direction based on a direction of a straight line connecting said one contour point $P_i$ and a midpoint between an Nth previous point $P_{i-N}$ and an Nth following point $P_{i+N}$ of said one contour point if the contour curvature of said one contour point $P_i$ is determined to fall in either "strong concavity" or "strong convexity," and to determine a contour direction based on a direction of a straight line connecting said Nth previous point $P_{i-N}$ and Nth following point $P_{i+N}$ if the contour curvature of said one contour point $P_i$ is determined to fall in "straight line/inflection point;" and
(e) program code means for causing said computer to output a feature value based on the contour direction of said one contour point.

BRIEF DESCRIPTION OF THE DRAWINGS

FIG. 6 is an enlarged view of the mask array of FIG. 5A illustrating the assignment of tracing directions to different mask array configurations resulting from scanning the PEL array pattern of FIG. 5A;

FIG. 12 is a diagrammatic illustration of an acuteness list, in accordance with a preferred embodiment of this invention, which is represented in a two dimensional matrix;

FIG. 19 is a diagrammatic illustration of feature values extracted by a conventional feature value extraction method for image analysis.

DETAILED DESCRIPTION OF THE INVENTION

A. Hardware Configuration

Figure 1:
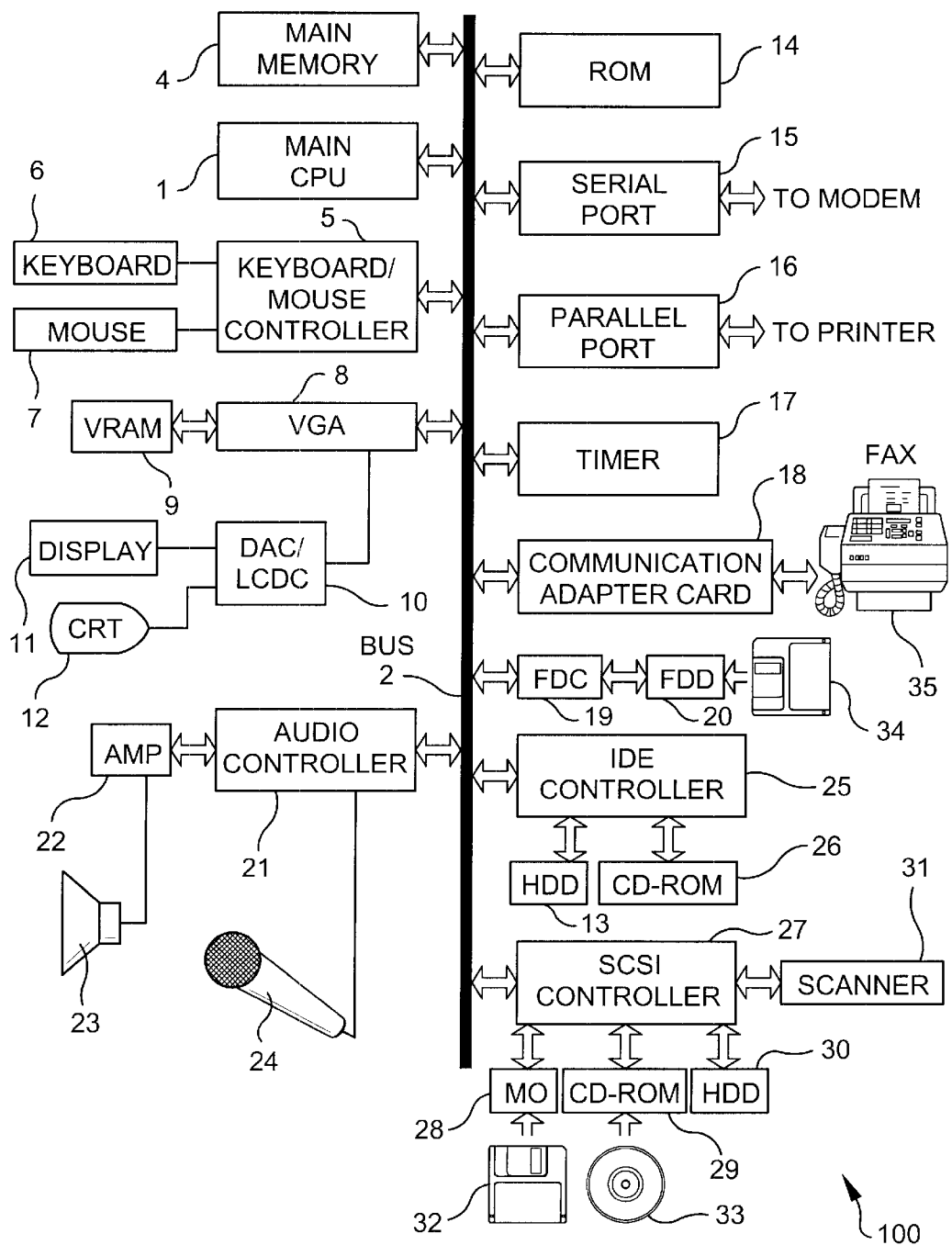
FIG. 1 is a block diagram illustrating a hardware configuration.

Now, with reference to the drawings, an embodiment of this invention will be described. Referring to FIG. 1, there is schematically shown a hardware configuration for implementing an image processing system 100 of this invention. The present system 100 includes a central processing unit (CPU) 1 and a memory 4. CPU 1 and memory 4 are connected to hard disk drives 13, 30 as auxiliary storage devices via a bus 2. A floppy disk drive (or another storage medium drive such as an MO drive 28, CD-ROM drives 26, 29) 20 is connected to bus 2 via a floppy disk controller (or a variety of controllers such as an IDE controller 25, a SCSI controller 27) 19.

A floppy disk (or another storage medium such as an MO disk 32, a CD-ROM 33) 34 inserted into floppy disk drive (or another storage medium drive such as MO drive 28, CD-ROM drives 26, 29) 20, hard disk drives 13, 30 and/or a ROM 14 is capable of storing a computer program code for practicing this invention. At the time of execution, this computer program code is loaded into memory 4 such that it cooperates with an operating system to provide instructions to CPU and the like. This computer program code may be compressed or divided into a plurality of segments for storing across a plurality of media. Similarly, each of said storage media is capable of storing input image data and processed image data as well.

Also, the present system 100 may be provided with user interface hardware, including a pointing device (such as a mouse, a joystick, a track ball) 7 for inputting information of positions on a screen, a keyboard 6 for supporting key input, as well as displays 11, 12 for presenting image data to a user. Also, a speaker 23 receives audio signals from an audio controller 21 via an amplifier 22, and outputs the audio signals as sounds.

Preferably, a PEL array pattern to be inputted into the present system 100 is created by a scanner 31 and provided to the present system 100 via a parallel port 16. Alternatively, such a PEL array pattern created by scanner 31 may be inputted into the present system 100 via a SCSI interface rather than parallel port 16 or another interface. The present system 100 may communicate with another computer via a serial port 15 and a modem or a communication adapter 18 such as token ring type for receiving image data or a PEL array pattern, or the present system 100 may receive an input from a storage medium such as floppy disk 34. Further, the present system 100 may be connected to a digital camera via serial port 15 for receiving image data therefrom.

It will be readily understood from the foregoing that this invention may be implemented by a conventional personal computer (PC), a workstation, a dedicated OCR, a computer incorporated into a variety of household electric appliances such as a TV set or a FAX machine, and any combinations thereof. Note, however, that these elements are listed for an exemplification purpose only, and all of these elements are not necessarily equated with essential elements of this invention. In particular, since this invention is directed to extraction of a feature value of an image, those elements such as serial port 15, communication adapter 18, audio controller 21, amplifier 22 and speaker 23 are non-essential elements in one aspect of this invention.

It is desirable to use either one of those operating systems supporting a GUI multi-window environment such as "Windows" (trademark of Microsoft Corp.), "OS/2" (trademark of IBM Corp.), "X-WINDOWS system" (trademark of MIT) on "AIX" (trademark of IBM Corp.), but this invention is not limited to a particular operating system environment.

FIG. 1 illustrates a system in a stand-alone environment, but this invention may be implemented as a client/server system in such a way that a client machine is connected to a server machine by means of a LAN such as an Ethernet or a token-ring. The client machine may be provided with a limited number of functions to be described below such as a command input means, an image input means and an image display means, whereas the server machine may be provided with the remaining functions. Various changes or modifications, including but not limited to a distribution of functions among a plurality of machines such as the server and client machines, may be freely made by those skilled in the art without departing from the spirit of this invention.

B. System Configuration

Next, with reference to a block diagram of FIG. 2, a system configuration of this invention will be described. In a preferred embodiment of this invention, an image processing system 300 comprises a command input means 301, a control means 303, an image analysis means 305, a processed result information storage means 307, an image display means 309, an image input means 311, a PEL array pattern storage means 321, a pattern matrix storage means 323, an x-y list storage means 327, an orientation table storage means 329, an orientation list 330, an acuteness list storage means 331 and a contour direction list storage means 333.

The command input means 301 receives those inputs from a user, including instructions for starting/ending of processing, setting of an input image or the like, and transmits them to the control means 303. The image input means 311 transmits image information inputted from a scanner or a FAX machine to the control means 303. Incidentally, prior to execution of image processing of this invention, a color image may be converted to a monochrome white/black gradation image by means of a grayscale or dithering conversion. Further, a smoothing process may be performed to eliminate noises contained in image information.

The image analysis means 305 is adapted for analyzing image information. The control means 303 controls each of the processing elements. The processed result information storage means 307 stores feature value information and the like that are obtained as a result of processing in the present system. The image display means 309 displays, on a display screen 12, image data inputted from the image input means 311 and/or image data stored into the processed result information storage means 307. The PEL array pattern storage means 321 is a work area, which is managed by the control means 303 and used for temporarily storing a PEL array pattern in process. Various matrix/list storage means 323 to 331 store various matrices/lists to be described below.

Figure 2:
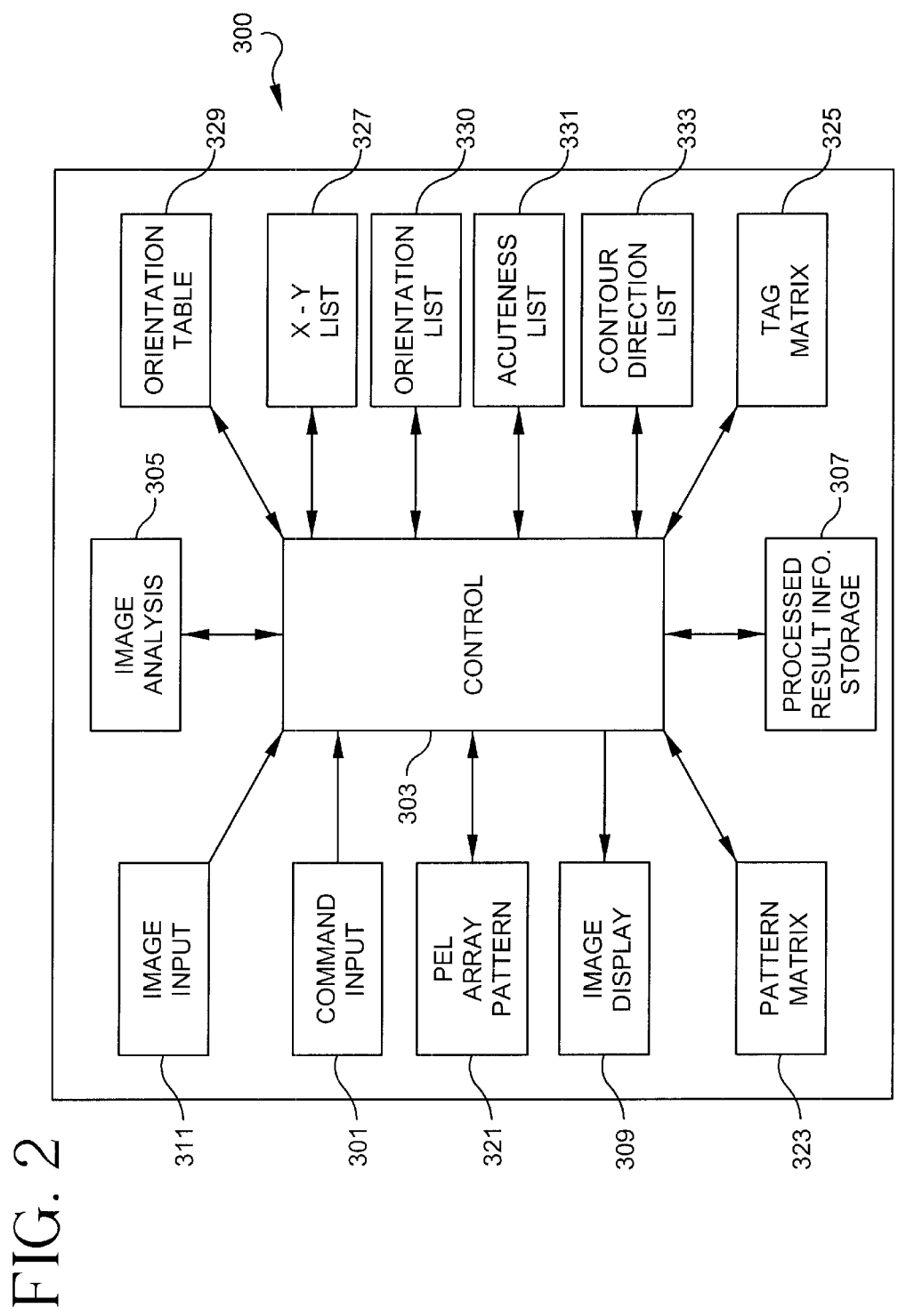
FIG. 2 is a block diagram of processing elements.

While each of the functional blocks shown in FIG. 2 has been described above, it is noted that these blocks are logical functional blocks. Thus, each of them is not necessarily implemented by bulky hardware/software components, but it may be implemented by combined or common hardware/software components. Further, it should be noted that all of the elements shown herein are not necessarily equated with essential elements of this invention.

Figure 3:
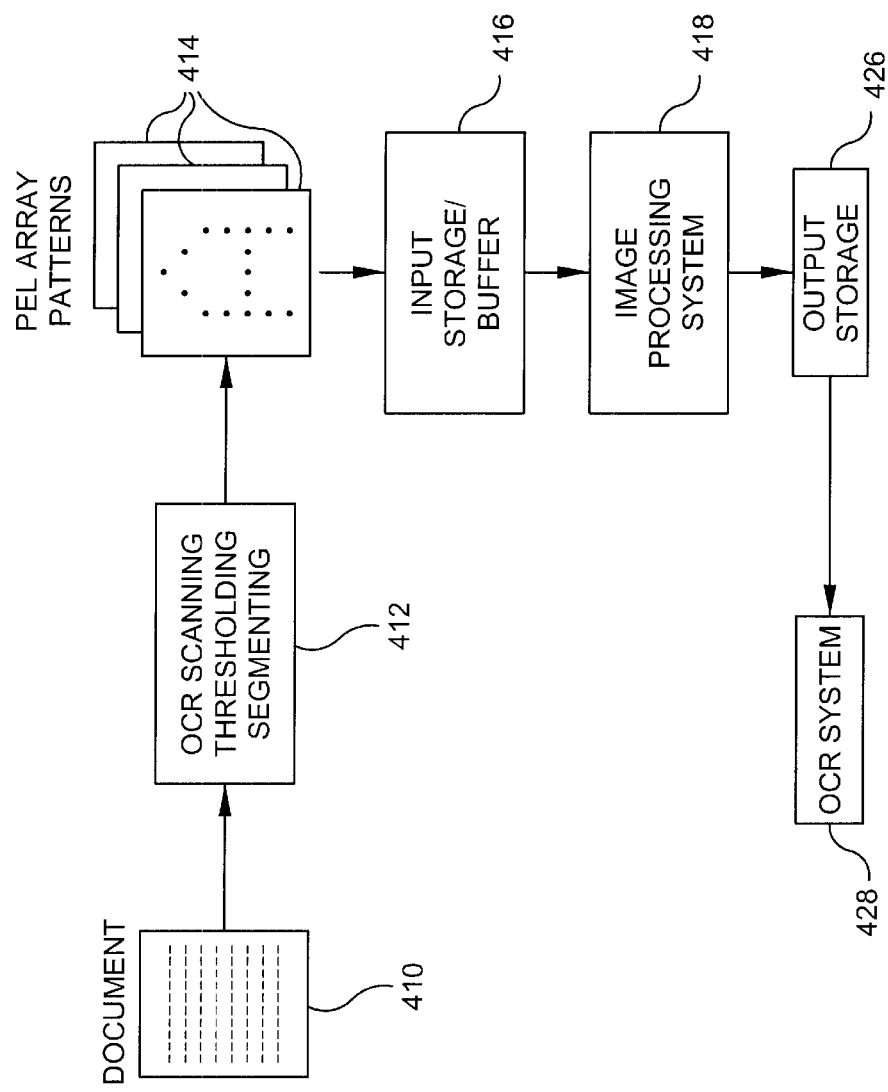
FIG. 3 is a block diagram illustrating an application of this invention to an optical character recognition system.

FIG. 3 is a block diagram illustrating an application of this invention to an OCR (optical character recognition) system. In this drawing, a document 410 contains one or more character images to be recognized. The document 410 may include a wide variety of character image bearing media in many forms and configurations, such as a letter containing alphanumeric text information, a drawing containing graphics and text information, a package or a label or a tag with alphanumeric text information requiring scanning, as might be used, for example, on a postal package.

Each inputted document 410 is scanned and thresholded and its character patterns are segmented using a conventional scanning, thresholding and segmenting apparatus 412. Devices of this type are well known in the art and typically include a document feed mechanism, a light source, a lens, plural optical sensing elements arranged in a line, a thresholding circuit and a segmenting circuit.

One optical element generates an analog signal corresponding to one PEL, and this analog signal is applied to the threshold circuit. A binary "1" signal representing a black PEL is generated if the analog signal is lower than a predetermined threshold value, and a binary "0" signal representing a white PEL is generated if the analog signal is higher than the threshold. The segmenting circuit separates each character image into separate or individual character PEL array patterns 414 as shown in FIG. 3. The PEL array patterns 414 can be stored into frames of 24×16 PELs, for example, in an input storage buffer 416.

An image processing system 418 extracts a feature value data set from this PEL array pattern and stores it into an output storage device 426. The feature value data set stored into the output storage device 426 is presented as an input to an optical character recognition system 428. The feature value data set generated in accordance with this invention could be utilized in various optical character recognition systems, which include neural network OCR systems utilizing back propagation methods, as well known in the art.

C. Description of Operations

Figure 4:
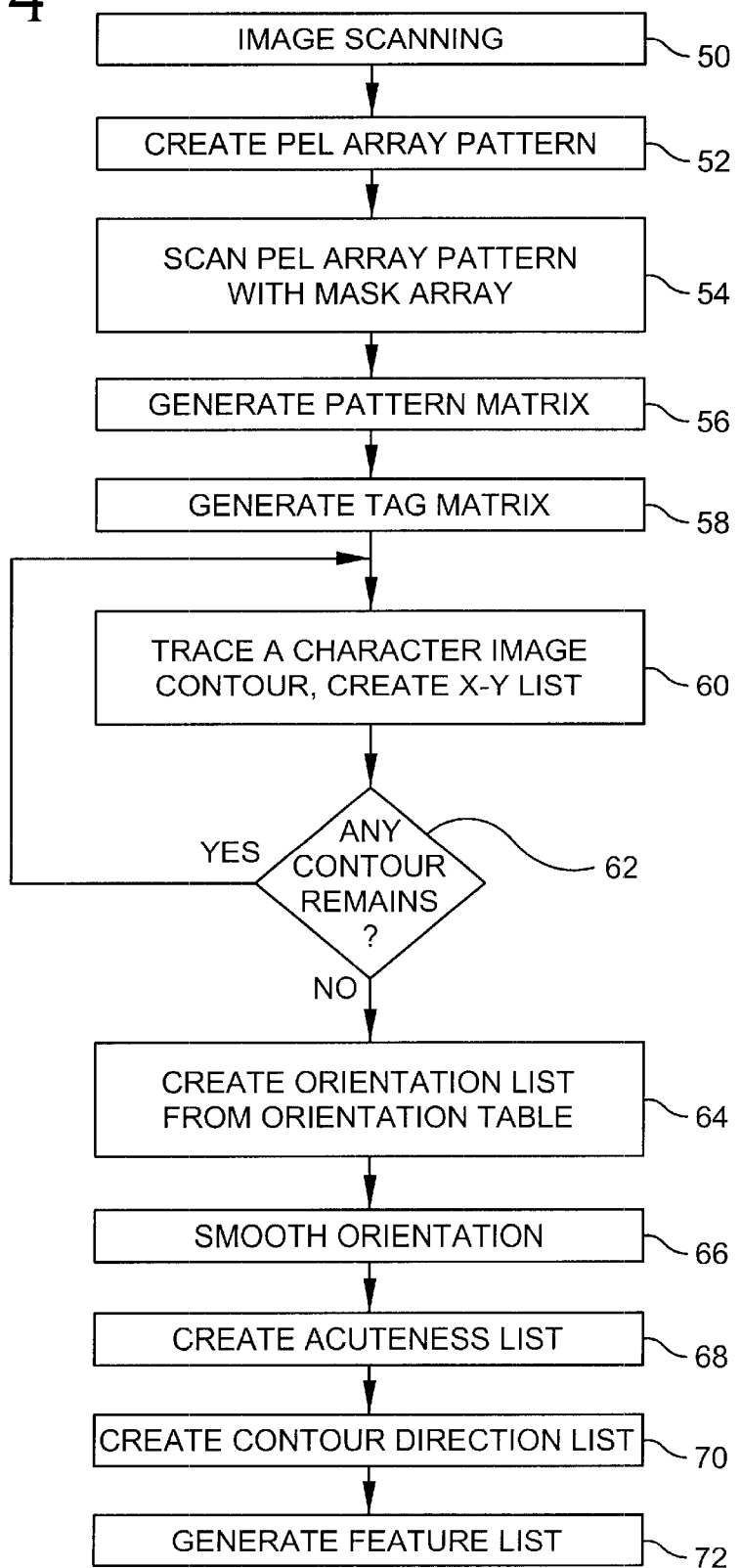
FIG. 4 is a flow chart illustrating a procedure of a feature value extraction method in accordance with a preferred embodiment of this invention.
Figure 5:
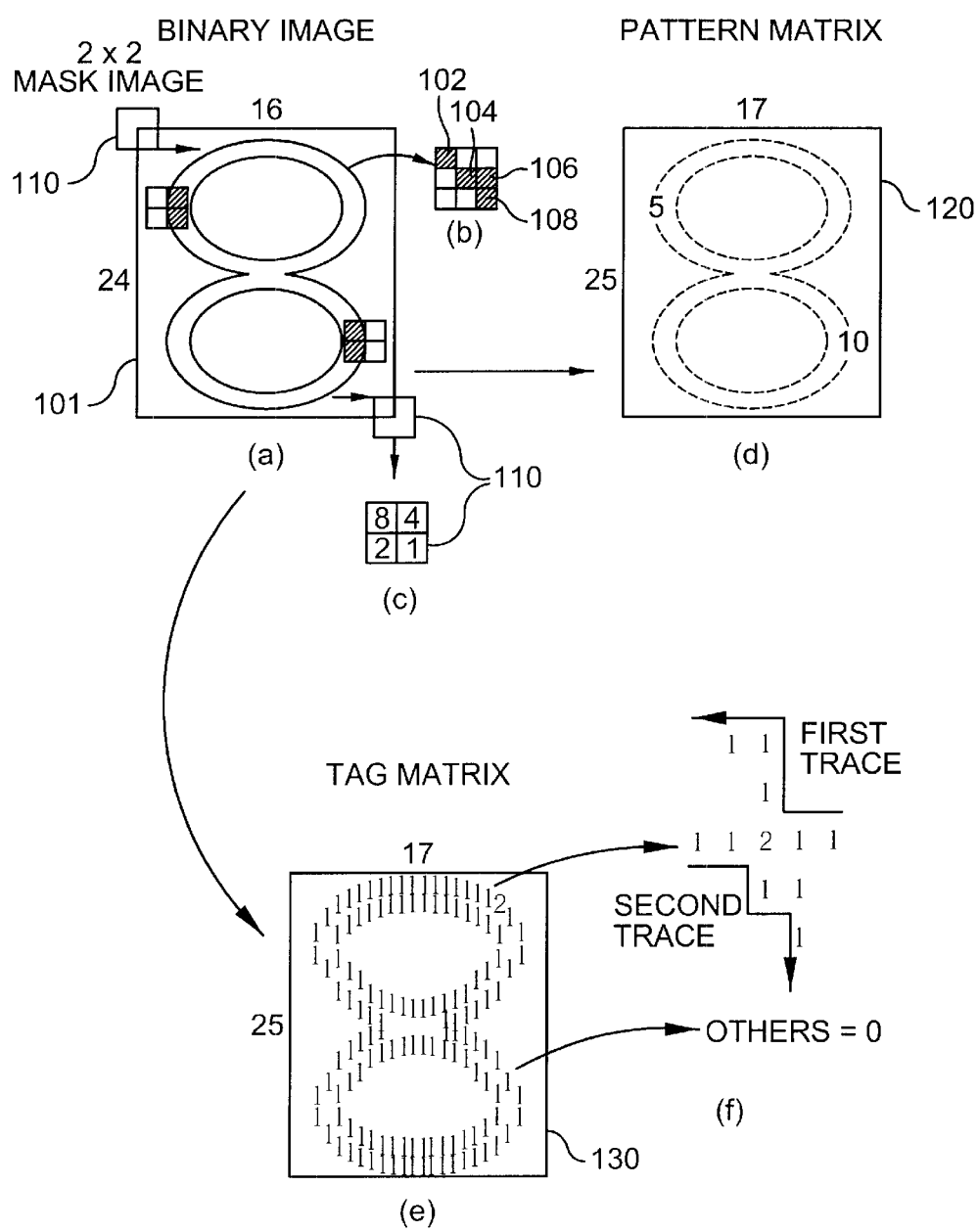
FIG. 5A illustrates a PEL array pattern and a mask array used for scanning the PEL array pattern.
FIG. 5B illustrates an enlarged view of a portion of the PEL array pattern of FIG. 5A showing the use of white and black colors in the PEL array pattern positions to represent a character image.
FIG. 5C is an enlarged view of the mask array of FIG. 5A showing the assignment of a binary value to each mask array position.
FIG. 5D is a diagrammatic illustration of a pattern matrix generated from the PEL array pattern of FIG. 5A in accordance with this invention.
FIG. 5E is a diagrammatic illustration of a tag matrix generated from the PEL array pattern of FIG. 5A in accordance with this invention.
FIG. 5F is an enlarged view of the tag matrix of FIG. 5E illustrating the assignment of numerical values to PEL array pattern positions for use in contour tracing.

FIG. 4 is a flow chart illustrating a procedure of a feature value extraction method in accordance with this invention. This procedure will now be described with further reference being made to FIG. 5 using, by way of example, a character image corresponding to the number "8." This number is used because it contains both exterior and interior contours, yet is not unduly convoluted or complex. Character image scanning is shown as occurring in step 50 of FIG. 4 to produce one or more PEL array patterns that are stored into the PEL array pattern storage means 321 (step 52). The PEL array pattern 101 of FIG. 5A is a 24×16 array of black and white picture elements representing the character image to be recognized. This PEL array pattern has a plurality of array positions, including positions 102–108 shown in FIG. 5B, representing continuous contours of the character image.

The first goal of the present procedure is to trace the exterior and interior continuous contours of the character image 101 to generate a list of contour points for each contour traced. A preferred procedure for tracing the contours of the character image "8" employs a 2×2 mask array 110 for scanning each line of the PEL array pattern 101 in a left to right horizontal sweep. FIG. 5C illustrates that the mask array 110 includes four array positions, which are assigned binary place values of "8," "4," "2" and "1." Depending on the combination of black and white PELs appearing in these positions, values from "0" to "15" can be read from the mask array 110. By way of example, a pattern value of "4+1=5" is derived if there are only two PELs on the right side, and a pattern value of "8+2=10" is derived if there are only two PELs on the left side.

In process step 54, the mask array 110 is used to scan every position of the PEL array pattern 101. This scanning results in the generation of a pattern matrix and a tag matrix in steps 56 and 58. The pattern matrix 120 is shown in FIG. 5D, whereas the tag matrix 130 is shown in FIG. 5E respectively. Each matrix includes 25×17 storage positions, which are generated by virtue of the fact that the center of the mask array 110, as shown in FIG. 5A, scans the PEL array pattern 101 from the left edge to the right edge, starting from the top edge of the PEL array pattern 101 and then between each row of the PEL array pattern 101 until the bottom edge is reached. In this way, each interior position of the pattern and tag matrices 120, 130 will correspond to a position representing the intersections of four positions of the PEL array pattern 101.

Each element of the pattern matrix 120 has a value (0–15) which is a weighted sum determined from the colors of the four array positions of the 2×2 mask array 110. These values are used for deciding a tracing direction, as discussed below. Each element of the tag matrix 130 is also assigned a value determined from the pattern appearing in the positions of the mask array 110. If the mask array positions are all white or all black (the pattern value being equal to 0 or 15), a value of "0" (no contour) is assigned to the corresponding tag matrix position. If the mask array 110 illustrates two black and two white PELs diagonally crossed (the pattern value being equal to 6 or 9), a value of "2" is assigned to the tag matrix 130. All other patterns result in a value of "1" being assigned to the tag matrix 130. The tag matrix 130 is used for tracing control such that contours are only traced once. A tag matrix value of "2" is a special case used for matrix positions that are part of two contours (see FIG. 5F).

The procedure for scanning the PEL array pattern 101 to generate the pattern matrix 120 and tag matrix 130 can be implemented in software using conventional programming languages such as C or the like. Additionally, process steps 54–58 could be partially implemented in hardware using storage registers 22, which preferably include a pair of 16-bit shift registers, as disclosed in said Japanese Patent Publication No. 6-195513. In this implementation, successive line pairs of the PEL array pattern 101 are entered into the shift registers. By successive shifts of each register, values for each position of the 2×2 mask array 110 are read sequentially and used to generate the pattern matrix 120 and tag matrix 130. It will also be appreciated that the tag matrix 130 can be generated using the values from corresponding positions of the pattern matrix 120.

Figure 7:
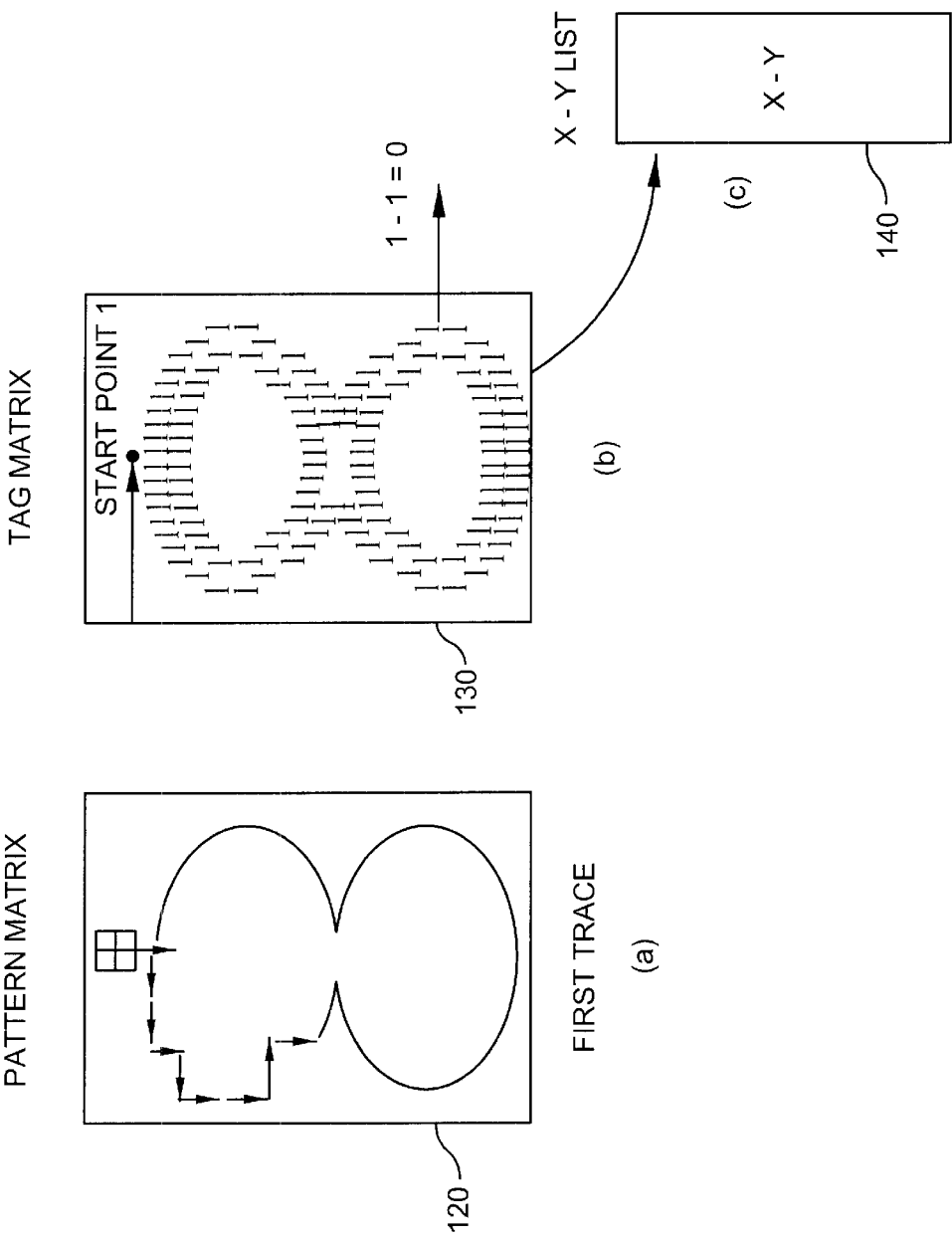
FIG. 7A illustrates a first character image contour trace illustrating the tracing direction information provided by the pattern matrix values.
FIG. 7B illustrates a first character image contour trace using the tracing control information provided by the tag matrix values.
FIG. 7C illustrates an x-y coordinate listing of character image contour points resulting from a first character image contour trace.

Next, in process step 60, a first contour of the inputted character image is traced and an x-y list is created. In the tracing procedure, the tag matrix 130 is scanned in a left to right direction to find a first non-zero value indicating a contour starting point. The x-y tag matrix coordinate positions of the starting point are stored into an x-y coordinate list 140 (FIG. 7C). To determine a direction to the next contour point, the pattern matrix 120 is consulted at the corresponding x-y coordinate position. At this position, there will be stored a value between "0" and "15" corresponding to the pattern of white and black PELs contained in the mask array 110 if positioned at that point. Based on the number assigned to the pattern matrix storage position, a tracing direction is determined as shown in FIG. 6. Pattern matrix values of "1," "5" and "13" indicate a downward tracing direction. Pattern matrix values of "2," "3" and "7" indicate a leftward tracing direction. Pattern matrix values of "8," "10" and "11" indicate an upward tracing direction. Pattern matrix values of "4," "12" and "14" indicate a rightward tracing direction.

If the pattern matrix value is "6" or "9," the direction value for the previous contour point is consulted to determine which direction to take, as shown in FIG. 6. It will be seen from FIG. 6 that the direction values assigned to the pattern matrix 120 are intuitively correct based on the appearance of the corresponding mask array patterns. If the mask array 110 is thought of as a window overlying the PEL array pattern 101, each mask array pattern will appear to correspond to a location on the contour of the inputted character image. FIG. 5D, for example, illustrates locations on the character contour patterns where mask arrays having values of "10" and "5" would be generated. It is easy to see that the directions assigned to the mask array values will cause the character contour to be followed during the tracing process.

For the PEL array pattern 101 of FIG. 5A, the trace starting point determined from the tag matrix 130 corresponds to a pattern matrix value of "1." As shown in FIG. 7A, the direction to the next contour point is downward. The remaining arrows in FIG. 7A diagrammatically illustrates successive tracing directions based on the pattern matrix value at each subsequent contour point. FIG. 7B illustrates the starting contour point of the tag matrix 130. Once the x-y coordinates of the starting point are placed in the x-y list, the tag matrix value at that location is decremented by "1" to indicate that the contour point has been treated. The x-y coordinate of the next contour point is then determined from the tag matrix 130 by moving one position in the tracing direction determined from the pattern matrix 120. The x-y coordinates of the next contour point are then stored into the x-y list and the process continues in similar fashion until the entire contour is traced.

Figure 8:
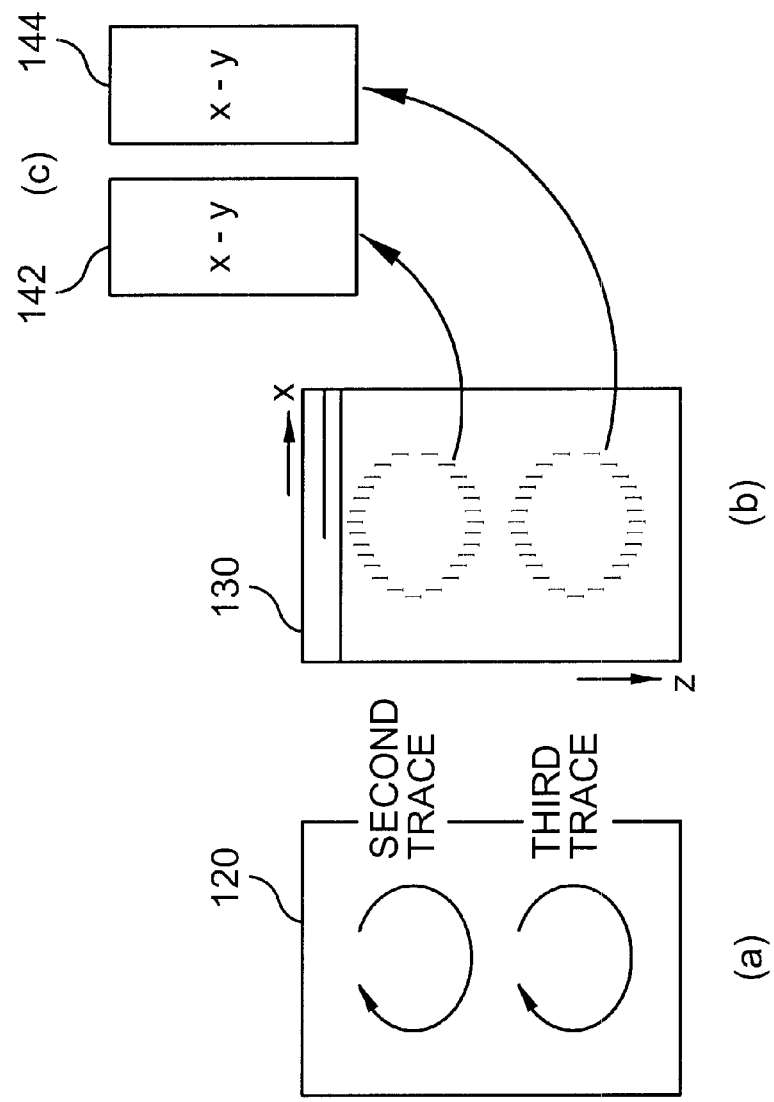
FIG. 8A illustrates second and third character image contour traces using the tracking direction information provided by the pattern matrix values.
FIG. 8B illustrates second and third character image contour traces using the tracing control information provided by the tag matrix values.
FIG. 8C illustrates x-y coordinate lists generated during second and third character image contour traces.

FIG. 7C illustrates an x-y list 140 generated by the tracing procedure. This trace will produce a list of x-y coordinate points defining the exterior contour of the input character image "8." Note here that, in a preferred embodiment of this invention, the x-y list has a ring structure that always contains an Nth previous point and an Nth following point of any contour point of interest. Subsequent second and third traces are performed in similar fashion as shown in FIG. 8 and x-y lists 142 and 144 are generated for the interior contours of the number "8." Following generation of the x-y lists 140, 142 and 144, the PEL array pattern 110, the pattern matrix 120 and tag matrix 130 are no longer required and may be discarded. This is because all contour points have been identified and stored into the respective x-y lists. Step 62 illustrates testing to determine whether additional contours reman.

Figure 9:
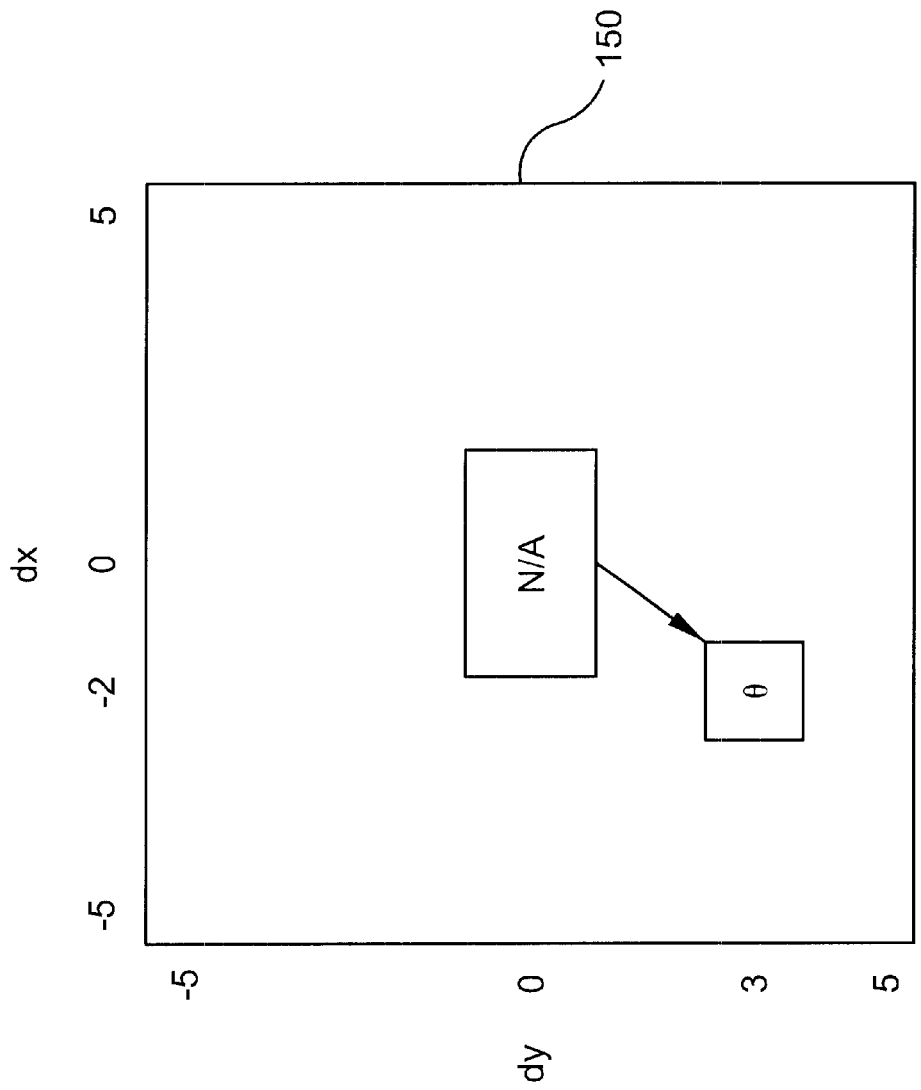
FIG. 9 illustrates a stored orientation table for use in determining relative orientations between coordinates of the x-y coordinate lists of FIGS. 13 and 16.

Following the identification of all contours, process step 64 is started. There, an orientation list representing the orientation directions or positional relations between selected points in the x-y list is generated. As shown in FIG. 9, the orientation list can be rapidly generated using an orientation table 150. The orientation table 150 has plural storage positions, each storage position containing a value representing an orientation direction between a contour point and a selected subsequent contour point. The orientation table is addressable using x-y offset values representing the difference in x-y coordinate value between the contour point and the selected subsequent contour point.

Figure 10:
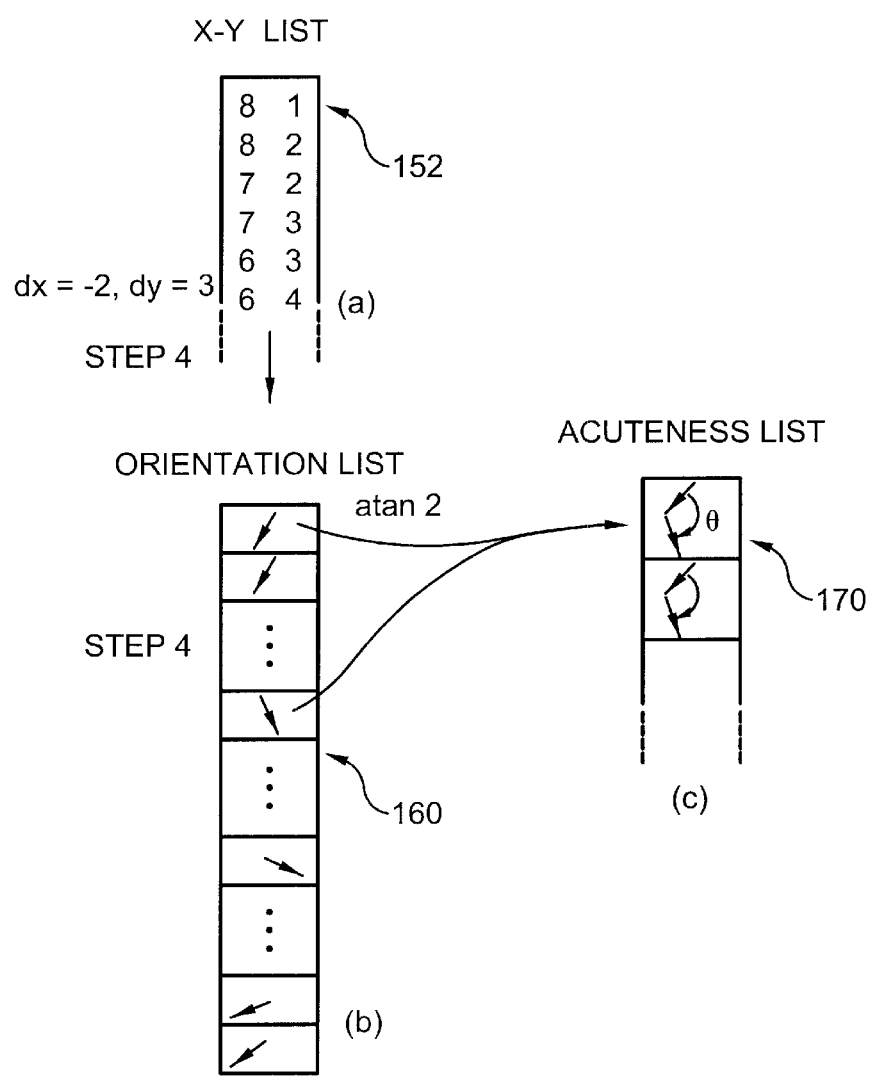
FIG. 10A is an enlarged x-y coordinate list illustrating the manner in which differential x and y values may be obtained between contour points and inputted as address values to the orientation table of FIG. 9.
FIG. 10B illustrates an orientation list of orientation value assigned to character image contour points.
FIG. 10C illustrates an acuteness list generated from the orientation list of FIG. 10B.

FIG. 10A illustrates an x-y list 152 containing a series of x-y contour point coordinate values. It is desirable to find an orientation direction from each contour point to an Nth following contour point. The number used for the threshold increment N may vary, but satisfactory results have been achieved using N=3 to 5 for 24×16 PEL array patterns. For PEL array patterns with more positions, high N values could be used. FIGS. 9 and 10, for example, are based on a threshold increment value of N=5.

The orientation for each contour point is thus defined as an arrow from the contour point to the Nth following point. It is quickly obtained using the precalculated orientation table 150, which preferably consists of (2N+1)×(2N+1) elements. In FIG. 10A, the x-y offset values between the first contour point (x=8, y=1) in the x-y list 152 and the fifth following contour point (x=6, y=4) in the x-y list are dx=−2 and dy=3. Using these values as addresses in the orientation table 150, it is seen that an orientation value Θ representing an angle from a reference position (center) to the orientation direction is quickly determined.

Figure 11:
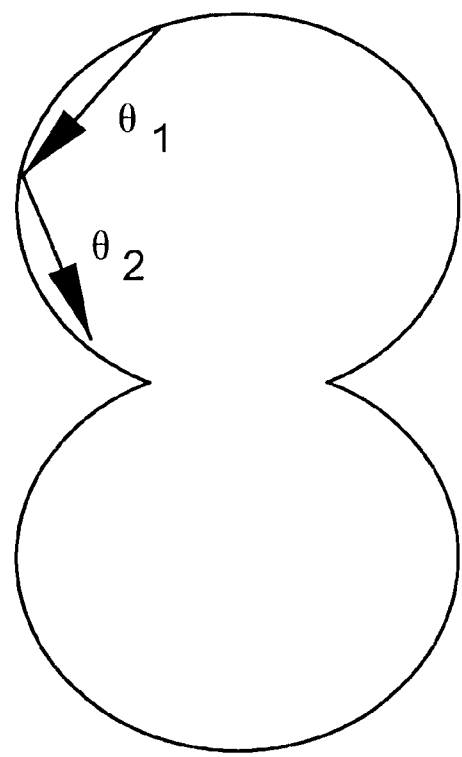
FIG. 11 diagrammatically illustrates the assignment of orientation values to points along a character image contour.

FIG. 11 graphically illustrates how the orientation values relate to the exterior contour of the letter "8." The orientation values determined in step 64 are stored into an orientation list 160 as shown in FIG. 10B. In some cases, it may be desirable to perform a smoothing process as in step 66 (FIG. 4) to provide enhanced orientation stability between the contour points. The smoothing process determines a more general angle between contour points by taking a weighted average of orientation values for the contour points immediately preceding and succeeding the contour point of interest. For example, a smoothed orientation value $\Theta_i$ for the $i^{th}$ contour point can be determined from the orientation values $\Theta_{i-1}$ and $\Theta_{i+1}$ for the immediately proceeding and succeeding contour points in accordance with the following equation:

$$(\Theta_{i-1} + 2\Theta_i + \Theta_{i+1})/4 \quad (1)$$

It is to be noted that smoothing is not generally required where the PEL array pattern 101 is sized at 50×50 PELs or larger and the threshold increment N is around 7 or more contour points.

Following generation of the orientation list and smoothing thereof, an acuteness list is generated in process step 68. The acuteness list is shown in FIG. 10C as reference number 170. The acuteness list is generated by determining values representing the acuteness angle of curvature between each contour point and the Nth following contour point. The acuteness angle is readily found by finding the difference between the orientation values $\Theta_i$ and $\Theta_{i+N}$ assigned to the $i^{th}$ and (i+N)th contour points. The value of "N" is preferably the same as that used in assigning orientation values.

In a preferred embodiment of this invention, using an acuteness value of a contour point of interest, its contour curvature is classified into either one of five curvature groups, comprising "strong concavity," "weak concavity," "straight line/inflection point," "weak convexity" and "strong convexity." It is assumed for convenience of the following description of a preferred embodiment that, in order to make preparations for such classification, angles 0 to 180 degrees (0 to π) that cover a whole angular range of convexity, and angles 0 to −180 degrees (0 to −π) that cover a whole angular range of concavity are evenly divided into ten segments (each segment has an angular range of π/10) respectively, whereby either one of nineteen different values ("9" to "−9") corresponding with these nineteen different segments is exploited as an acuteness value of a contour point of interest.

FIG. 12 is a diagrammatic illustration of an acuteness list, which is represented in the form of a two dimensional matrix, for contours (25×17) of a sample handwritten character "5" (24×16). For brevity of this drawing, the letter "a" represents a value of "−1," and the letter "i" represents a value of "−9." Note that a value of "9" represents the strongest convexity, whereas a value of "−9" (i) represents the strongest concavity. In a preferred embodiment of this invention, a point having a value of "9–4" is classified as "strong convexity," a point having a value of "3–2" as "weak convexity," a point having a value of "1–a" as "straight line/inflection point," a point having a value of "b–d" as "weak concavity," and a point having a value of "e–i" as "strong concavity" respectively. Such classification of the five different curvature groups has been employed in consideration of both speeding up of calculations and improvement of recognition rates.

In a preferred embodiment of this invention, the values of "1," "0" and "a" are specifically treated in a unified manner as falling in the group of "straight line/inflection point," without distinguishing subtle concavity/convexity represented by each of these values. This is due to the following reasons:

(1) a slight difference among these values causes the designation of concavity/convexity to be changed from one to another, which results in instability;

(2) there is a high probability that a pair of linear contours, as seen for the letter "1," are present on both sides of a black linear stroke and, hence, it is not so important that one or more black PELs of the stroke or the background are present on which side (there is no substantial benefit of doubling the number of feature dimensions); and (3) it is desirable to treat the definition of a contour direction separately from the contour points that have clear designation of concavity/convexity, as described below.

Figure 13:
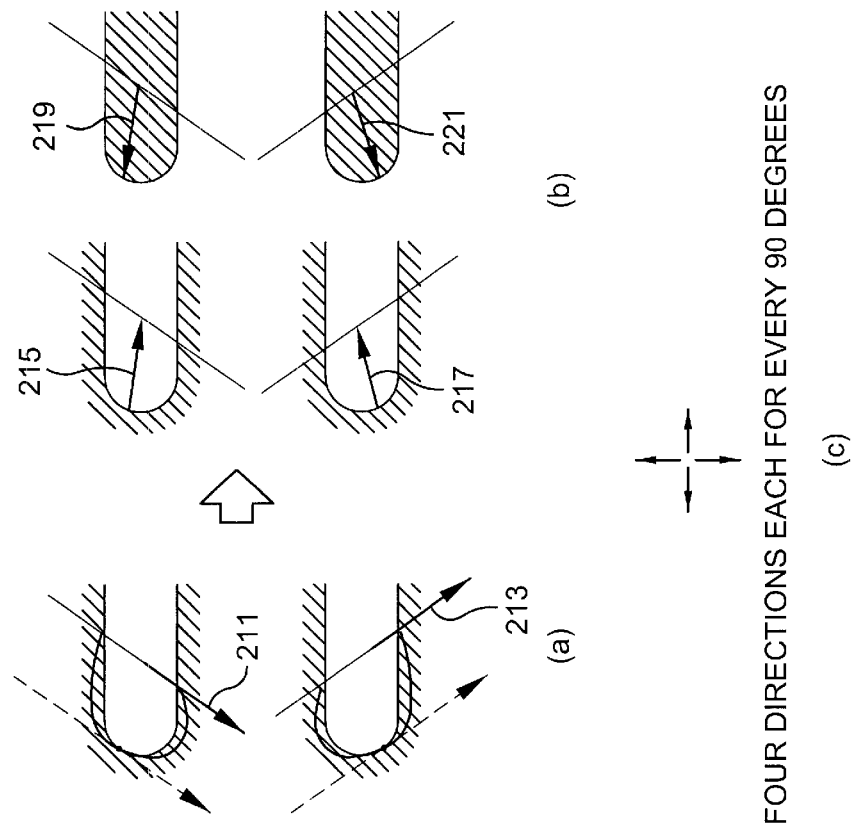
FIGS. 13A to 13C are diagrammatic illustrations for explaining derivation of a contour direction.

Next, in process step 70, a contour direction list is generated. In a smaller image of 24×16 other than an analog image or a character image of a larger size, it is difficult to stably determine a strength of a contour curvature and a contour direction (determination of the direction is especially difficult). As shown in FIG. 13A, simply connecting an Nth previous point and an Nth following point to define this straight line as a tangent line direction, such directions at the neighboring contour points remarkably varies from each other. In vicinity to a contour point having acuteness represented by a large absolute value, it is preferable to define the same direction as much as possible.

Thus, in a preferred embodiment of this invention, a midpoint of the straight line, which connects the Nth previous point and the Nth following point, is further connected with a contour point of interest to define a normal line direction (as shown in FIG. 13B), thereby to employ it as a contour direction. In place of the contour direction so defined, a direction (or its reverse direction) that falls between or a half angle of two vectors from the contour point of interest $P_i$ to the Nth previous point $P_{i-N}$ (vector $P_i P_{i-N}$) and from the contour point of interest $P_i$ to the Nth following point $P_{i+N}$ (vector $P_iP_{i+N}$) may be employed as an alternative contour direction. Further, in place of the Nth previous point and the Nth following point, Nth previous point and the Mth following point (M is a value close to N) may be used for performing calculations involved.

Further, in a preferred embodiment of this invention, calculated contour directions are classified on a certain bundle basis to obtain feature values. Results of experiment conducted by the present inventor have demonstrated higher recognition rates relative to computation speed, if a contour direction of a point having "strong concavity/convexity" is classified into either one of the upward, downward, leftward and rightward directions, as shown in FIG. 13C.

Figure 14:
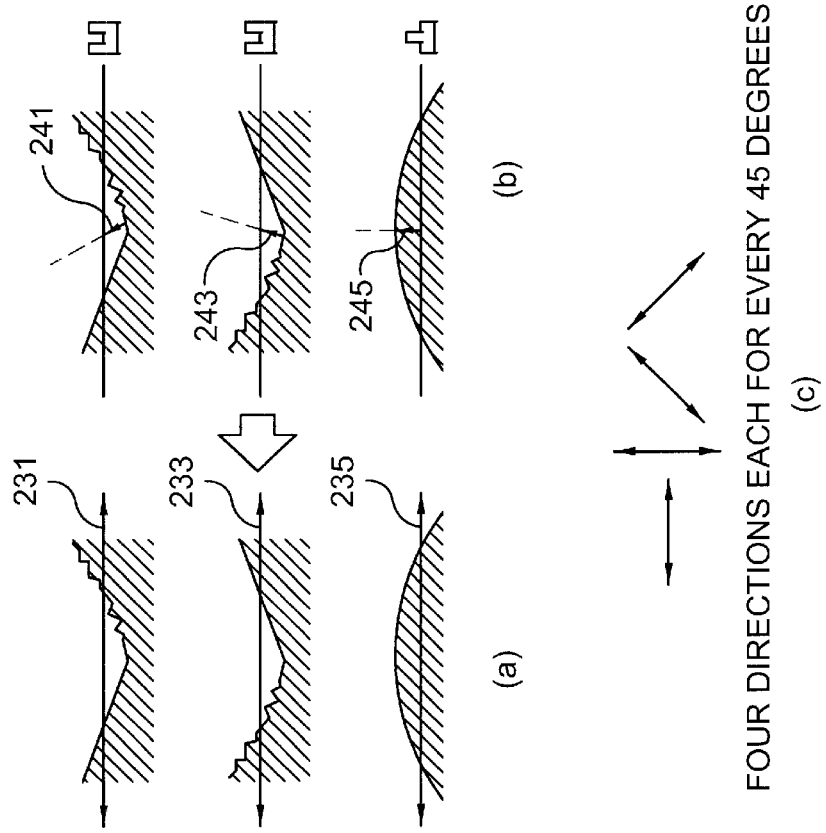
FIGS. 14A to 14C are diagrammatic illustrations for explaining derivation of a contour direction.

On the other hand, if this definition is applied to the curvature group of "straight line/inflection point," a slight difference will cause the designation of "concavity/convexity" to be changed from one to another, yet it will lead to dispersion of the directions, as shown in FIG. 14B. Thus, for these cases, the Nth previous point and the Nth following point are connected in disregard of the point of interest such that its direction (tangent line direction) is employed as a contour direction (as previously described, it is not so important that one or more black PELs of the stroke or the background are present on which side). Results of experiment conducted by the present inventor have demonstrated that it is not so important as to which direction is pointed to by an arrow of a straight line. Also, the experimental results have demonstrated higher recognition rates relative to computation speed, if a contour point is classified into either one of the four directions each for every 45 degrees as shown in FIG. 14C, in disregard of a direction pointed to by an arrow.

A contour direction of a point having "weak concavity/convexity" may be calculated using a scheme similar to the one for "strong concavity/convexity" or another one for "straight line/inflection point," but the former is employed in a preferred embodiment of this invention.

Figure 15:
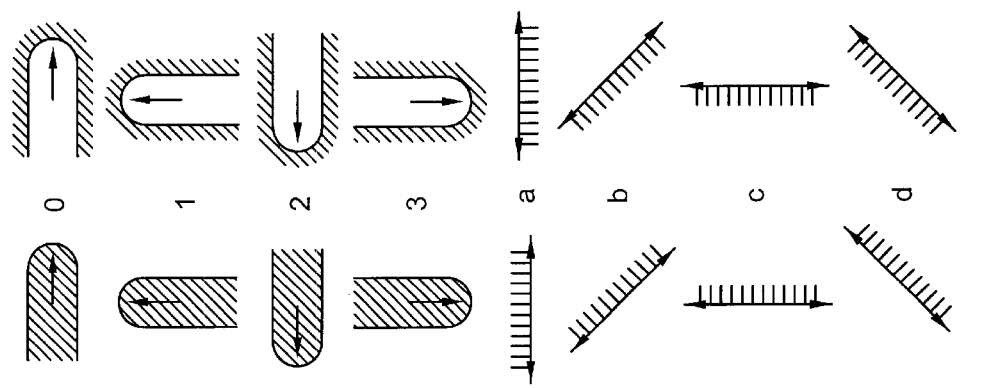
FIG. 15 is a diagrammatic illustration of a contour direction list, in accordance with a preferred embodiment of this invention, which is represented in a two dimensional matrix.
Figure 17:
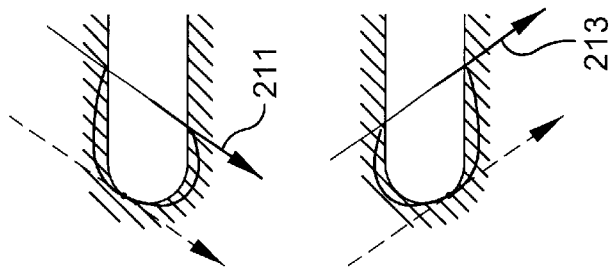
FIG. 17 is a diagrammatic illustration of the manner for deriving a contour direction, which is one of the feature values to be extracted by a conventional feature value extraction method for image analysis.
Figure 16:
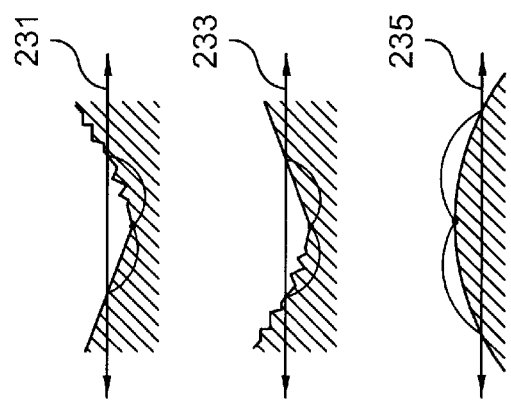
FIG. 16 is a diagrammatic illustration of the manner for deriving a contour direction, which is one of the feature values to be extracted by a conventional feature value extraction method for image analysis.
Figure 18:
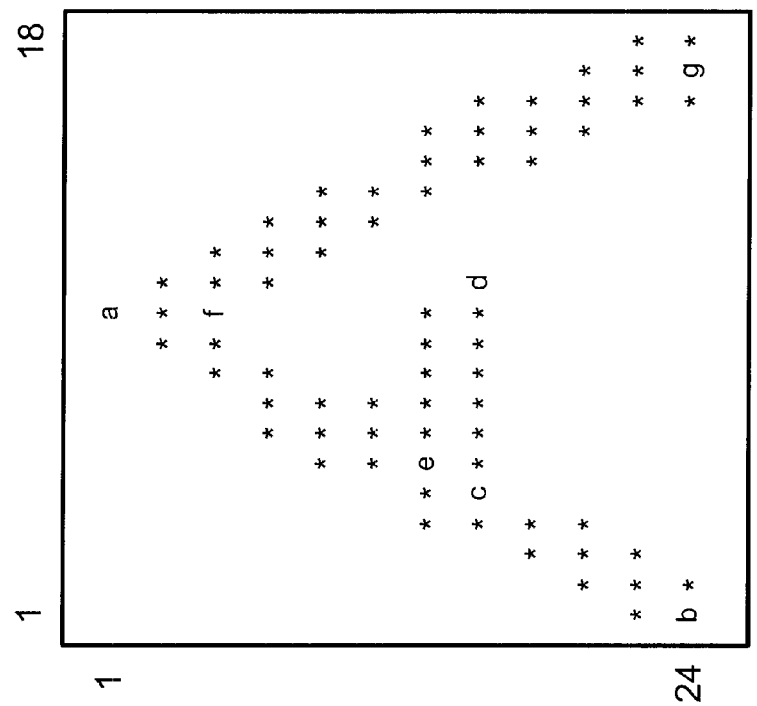
FIG. 18 is a diagrammatic illustration of an exemplary picture element (PEL) array to be inputted to a conventional feature value extraction method for image analysis.

FIG. 15 is a diagrammatic illustration of a contour direction list, which is represented in the form of a two dimensional matrix, for contours (25×17) of a sample handwritten character "5" (24×16). In this drawing, each value of "a–d" represents a contour direction for "straight line/inflection point," whereas each value of "0–3" represents a contour direction for both of strong and weak concavity/convexity.

In process step 72, a processed result data (feature value data) set is generated. Also, in a preferred embodiment of this invention, a character image is divided into 3×3 areas, and classifies each point of interest depending on a particular area in which the point exists (declarative example of C language: —int feat[3][3][4][5]).

In this declarative example of C language, the first dimension is an item for identifying a particular area, in which a point of interest exists, among three areas divided vertically in a PEL array pattern, the second dimension is an item for identifying a particular area, in which a point of interest exists, among three areas divided horizontally in the PEL array pattern, the third dimension is an item for classifying a point of interest into either one of the four different contour directions, and the last dimension is an item for classifying a point of interest into either one of the five different groups, comprising "strong concavity," "weak concavity," "straight line/inflection point," "weak convexity" and "strong convexity," whereby these attributes may be utilized for classifying and counting each contour point. By way of example, a point 231 at the rightmost top position of "5" has the classification values of the first dimension=0 (upper area), the second dimension=2 (right area), the third dimension=0 (right direction), and the fourth dimension=0 (strong convexity). The classified data is stored into the processed result information storage means 307 and is passed to the optical character recognition program 428 for character recognition.

D. Advantages of the Invention

As described above, in accordance with this invention, it is possible to quickly extract stable feature values that contribute to improvement of image recognition rates, without depending on a contour shape of a graphic. Further, in one aspect of this invention, it is possible to extract for a point on a detected contour a unitary feature value, which is defined by either one of five different curvatures (i.e., strong concavity, weak concavity, straight line/inflection point, weak convexity, and strong convexity), as well as either one of four different contour directions, no matter what contour shape is involved.

What is claimed is:

1. A method for analyzing one or more contours detected from a picture element (PEL) array pattern and extracting feature values of the PEL array pattern, comprising the steps of:

tracing the contours of said PEL array pattern and generating a list of a plurality of contour points that exist on each traced contour;

calculating, for one contour point $P_i$ among said plurality of contour points, an acuteness value representing a contour curvature;

based on the calculated acuteness value, determining one of curvature groups comprising strong concavity, weak concavity, straight line/inflection point, weak convexity and strong convexity, in which the contour curvature of said one contour point $P_i$ falls;

if the contour curvature of said one contour point $P_i$ is determined to fall in either strong concavity or strong convexity, then determining a contour direction based on a direction of a straight line connecting said one contour point $P_i$ and a midpoint between an Nth previous point $P_{i-N}$ and an Nth following point $P_{i+N}$ of said one contour point, and if the contour curvature of said one contour point $P_i$ is determined to fall in straight line/inflection point, then determining a contour direction based on a direction of a straight line connecting said Nth previous point $P_{i-N}$ and Nth following point $P_{i+N}$; and outputting a feature value based on the contour direction of said one contour point.

2. A computer readable storage medium for storing a program that is arranged to analyze one or more contours detected from a picture element (PEL) array pattern and to extract feature values of the PEL array pattern, said program comprising:

program code means for causing said computer to trace the contours of said PEL array pattern and to generate a list of a plurality of contour points that exist on each traced contour;

program code means for causing said computer to calculate, for one contour point $P_i$ among said plurality of contour points, an acuteness value representing a contour curvature;

program code means for causing said computer to determine, based on the calculated acuteness value, one of curvature groups comprising strong concavity, weak concavity, straight line/inflection point, weak convexity and strong convexity, in which the contour curvature of said one contour point $P_i$ falls;

program code means for causing said computer to determine a contour direction based on a direction of a straight line connecting said one contour point $P_i$ and a midpoint between an Nth previous point $P_{i-N}$ and an Nth following point $P_{i+N}$ of said one contour point $P_i$ if the contour curvature of said one contour point $P_i$ is determined to fall in either strong concavity or strong convexity, and to determine a contour direction based on a direction of a straight line connecting said Nth previous point $P_{i-N}$ and Nth following point $P_{i+N}$ if the contour curvature of said one contour point $P_i$ is determined to fall in straight line/inflection point; and program code means for causing said computer to output a feature value based on the contour direction of said one contour point.

3. Apparatus for analyzing one or more contours detected from a picture element (PEL) array pattern and extracting feature values of the PEL array pattern, the apparatus comprising:

at least one processor operative to: (i) trace the contours of said PEL array pattern and generating a list of a plurality of contour points that exist on each traced contour, (ii) calculate, for one contour point $P_i$ among said plurality of contour points, an acuteness value representing a contour curvature, (iii) based on the calculated acuteness value, determine one of curvature groups comprising strong concavity, weak concavity, straight line/inflection point, weak convexity and strong convexity, in which the contour curvature of said one contour point $P_i$ falls, (iv) if the contour curvature of said one contour point $P_i$ is determined to fall in either strong concavity or strong convexity, then determine a contour direction based on a direction of a straight line connecting said one contour point $P_i$ and a midpoint between an Nth previous point $P_{i-N}$ and an Nth following point $P_{i+N}$ of said one contour point, and if the contour curvature of said one contour point $P_i$ is determined to fall in straight line/inflection point, then determine a contour direction based on a direction of a straight line connecting said Nth previous point $P_{i-N}$ and Nth following point $P_{i+N}$, and (v) output a feature value based on the contour direction of said one contour point.

* * * * *